E. M. KNOTHE.
CAR FENDER.
APPLICATION FILED APR. 9, 1914.
1,189,832.
Patented July 4, 1916.
4 SHEETS—SHEET 4.
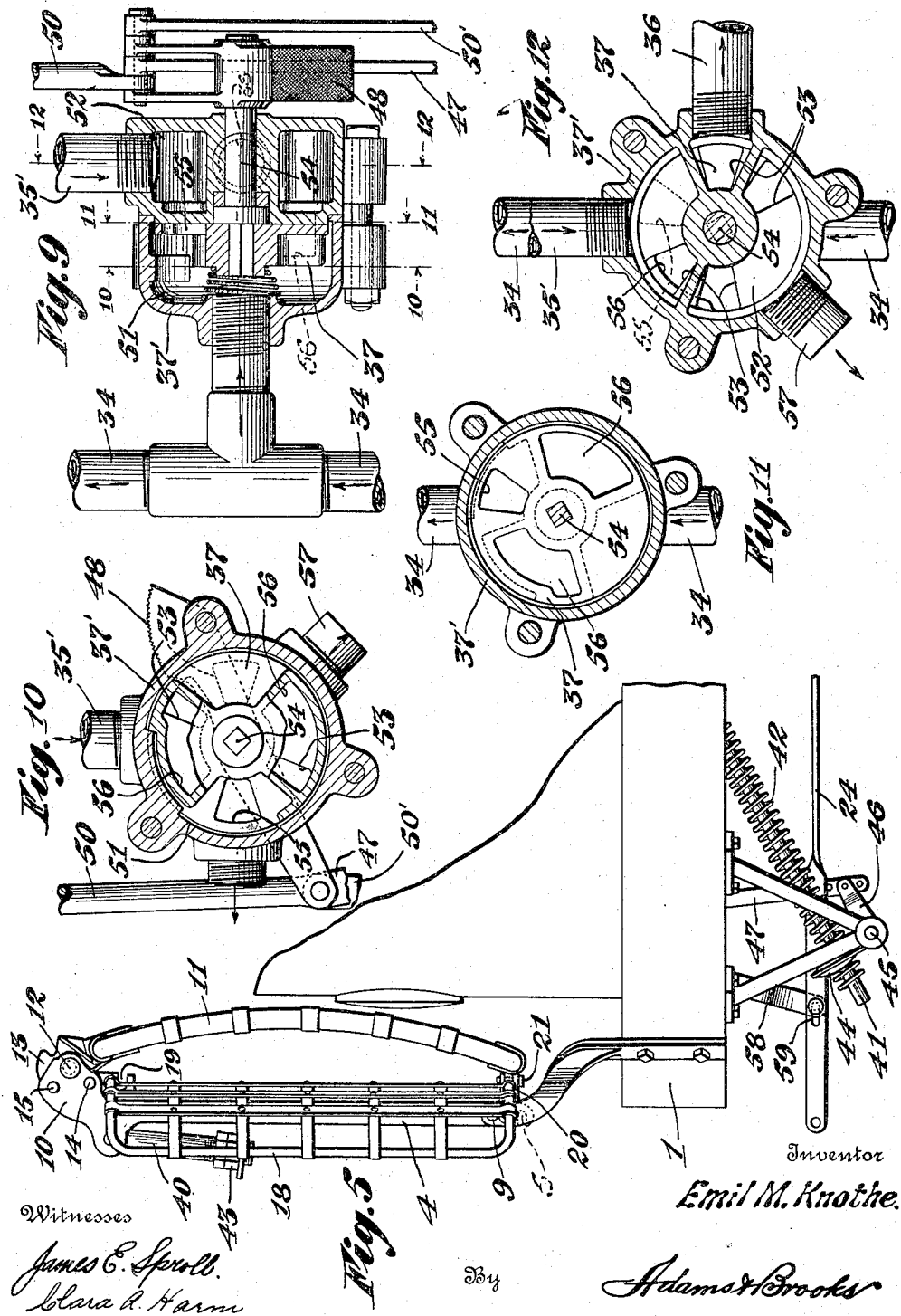
Witnesses
James E. Sproll
Clara A. Harm
Inventor
Emil M. Knothe.
By
Adams & Brooks
Attorneys

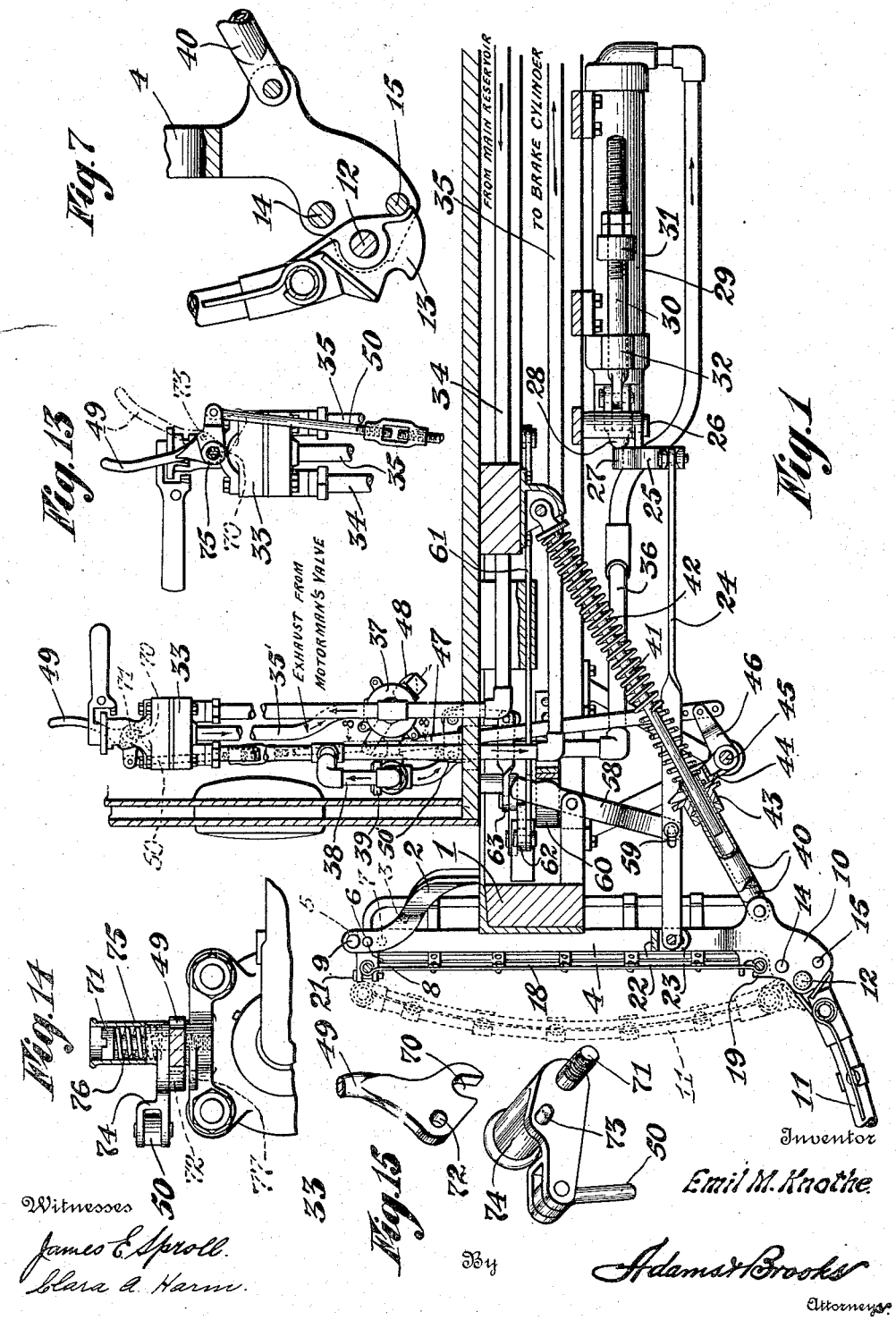

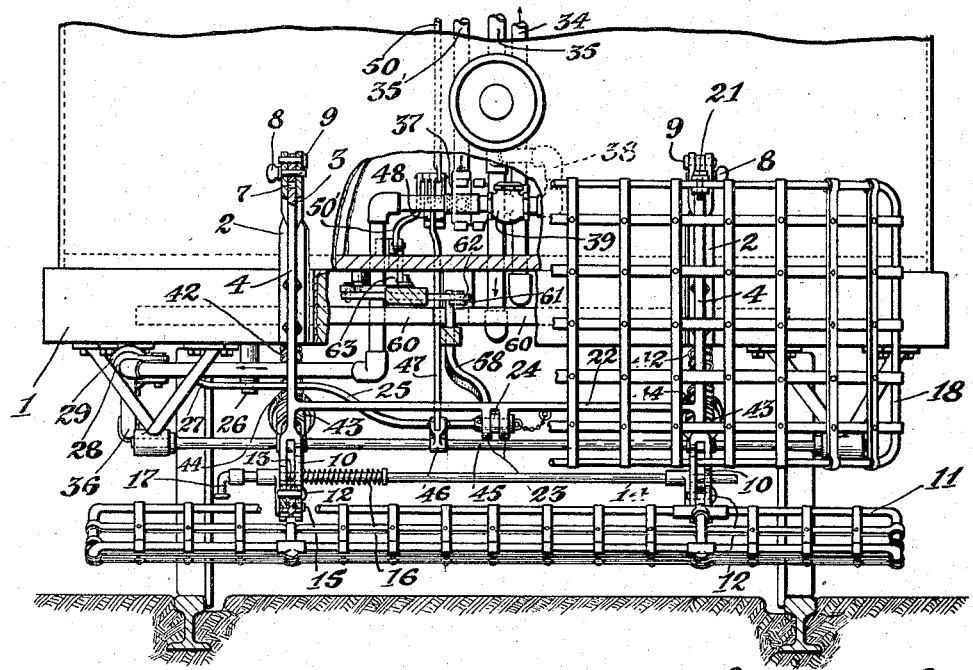

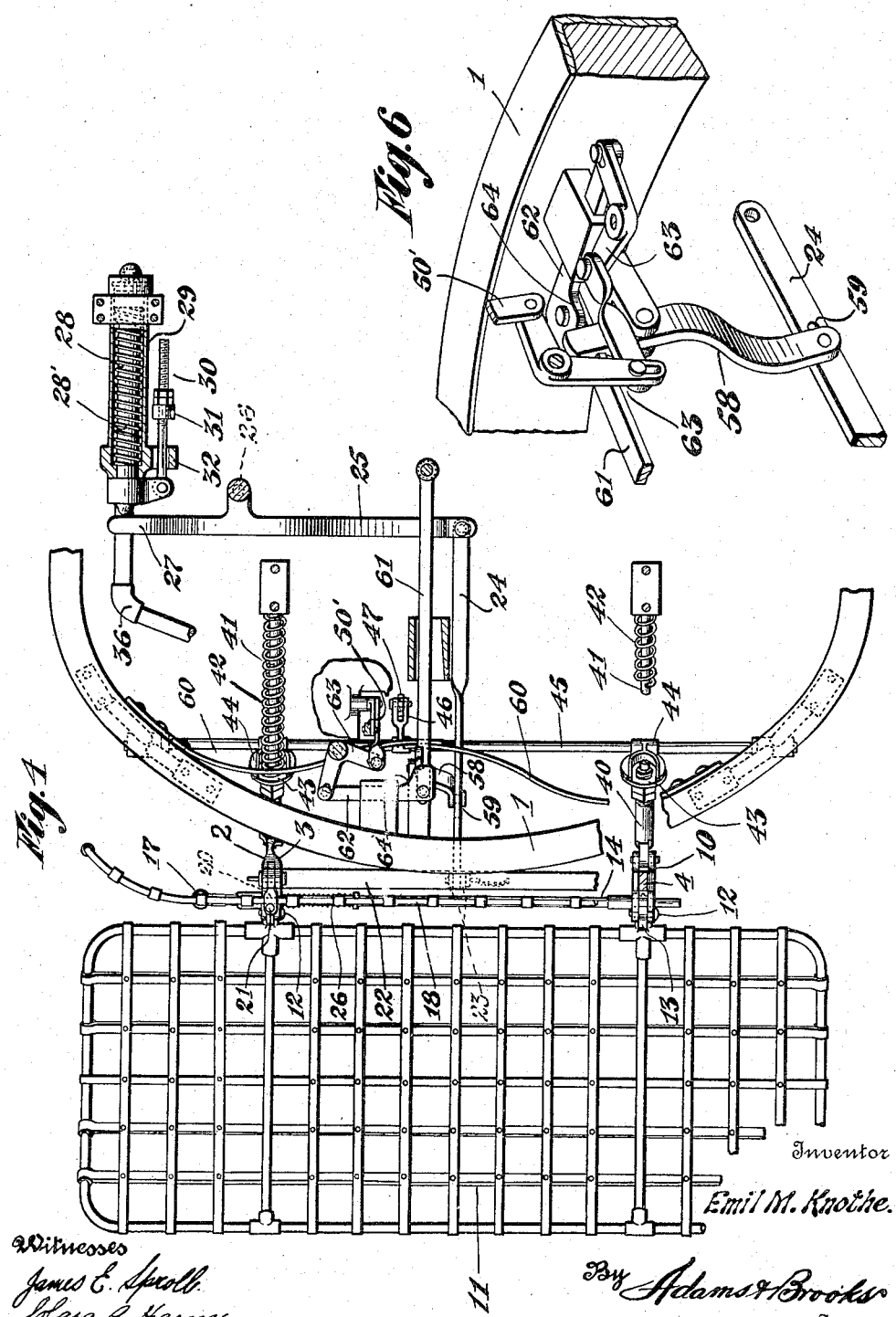

UNITED STATES PATENT OFFICE.

EMIL M. KNOTHE, OF SEATTLE, WASHINGTON, ASSIGNOR TO EMELINE KNOTHE, OF SEATTLE, WASHINGTON.

CAR-FENDER.

1,189,832.      Specification of Letters Patent.      Patented July 4, 1916.

Application filed April 9, 1914. Serial No. 830,704.

*To all whom it may concern:*

Be it known that I, EMIL M. KNOTHE, a citizen of the United States of America, and a resident of the city of Seattle, in the county of King and State of Washington, have invented certain new and useful Improvements in Car-Fenders, of which the following is a specification.

This invention has for its primary aim to provide a fender of simplified and yet durable construction which will automatically operate in an efficient manner in performing its desired functions.

A further object resides in the provision of an auxiliary spring mechanism for controlling and operating the fender, the same acting conjointly with but being especially designed for utilization when the pneumatic mechanism is disabled.

Further aims and objects of equal importance will appear as the description progresses, and those features of construction, arrangements and combinations of parts on which protection is desired will be succinctly defined in the appended claims.

A full understanding of this invention may be obtained from the following specification and the accompanying drawings wherein—

Figure 1 is a fragmentary longitudinal elevation of a car having my improved fender attached and disclosing in dotted lines the fender apron folded up against the guard frame. Fig. 2 is a front elevation thereof with parts omitted for clearness. Fig. 3 is a section of the fender mounted on the bumper of a car and disclosing, in dotted lines, the limit of normal yieldability of the fender, in which position the fender operating or dropping means is set in motion, and in dot and dash lines the fender in its fully lowered and operative position. Fig. 4 is a top plan view of the fender in position on the car with the platform of the latter removed. Fig. 5 is a side elevation of the fender swung to its inverted, inoperative position permitting of easy access to the draft gear. Fig. 6 is a detail perspective of the fender dropping mechanisms. Fig. 7 discloses, on an enlarged scale, the mounting of the fender on its supporting brackets. Fig. 8 is a section on line 8—8 of Fig. 1, showing more clearly the connection, in part, between the air reservoir and the fender and brake cylinders. Fig. 9 is a vertical cross section of the fender valve employed in the present construction. Figs. 10, 11 and 12 are vertical transverse sections of the valve taken on lines 10—10, 11—11 and 12—12 of Fig. 9, Fig. 12 showing the disposition of the valve for exhausting both cylinders. Fig. 13 is an elevation of the handle for manually operating the fender valve, said view being taken from the opposite side of the controlling valve shown in Fig. 1. Fig. 14 is an enlarged top plan view of the mounting of the fender valve handle, and Fig. 15 is a detail perspective thereof.

It may be preliminarily mentioned that in the preferred embodiment of the invention, which is illustrated in the accompanying drawings, there are employed the fender apron, supported from the car for yielding movement on encountering an obstruction on the track, a fender operating cylinder, a connection interposed between the cylinder and the fender whereby the latter is operated on admitting a fluid under pressure into the cylinder, a mechanism under control of the fender for admitting a fluid under pressure into the fender cylinder and, through a connection provided, into the brake cylinder also for applying the brakes simultaneously therewith, and an auxiliary spring mechanism for operating the fender conjointly with the fluid pressure mechanism and adapted to act alone on disablement of the latter.

Referring more in detail to the accompanying drawings, wherein like characters of reference are employed for the designation of similar parts throughout, numeral 1 represents the car bumper on which brackets 2 are mounted, each being furcated, as at 3, for receiving the upright supports or suspension bars 4 of the fender.

The upper end portion of each support 4 is provided with a rearwardly extending slot 5 and a pair of apertures 6 and 7 below the slot, while the brackets 2 are formed in their furcations with two sets of alining apertures to receive the pins 8 and 9, the former passing through aperture 6 and constituting a pivotal mounting for the support 4 while the pin 9 normally engages in slot 5 to permit of backward yielding only, of the fender, and is adapted to be removed to allow of the fender being swung upwardly, as shown in Fig. 5, and inserted in aperture 7 to retain the fender in said position.

The lower ends of supports 4 terminate in brackets 10 for supporting the fender apron 11, the latter being supported by pivots 12 passing through provided apertures of webs 13 of the apron. A transversely slidable rod 14, supported in brackets 10, overlies webs 13 to support the apron from independent movement toward the track relative to the supports 4 while lock pins 15, mounted on said brackets, normally engage beneath said webs to prevent relative upward swinging of the apron. When desirous of elevating the apron to the position shown in dotted lines of Fig. 1, the pins 15 are removed and subsequently reinserted to support the apron in said position by engaging another portion of the webs (see Fig. 7). To facilitate removal of pins 15, the same are fixed to rod 14 which is normally held inwardly by a spring 16 and provided with a handle 17.

A guard frame 18 is seated in seats 19 of brackets 10 in front of bumper 1 and has its upper frame member entered in pockets 20 where it is retained by locking pins 21.

A horizontal connecting bar 22 between the supports 4 is centrally provided with depending ears 23 pivoted to the forward end of a rearwardly disposed link bar 24 which, in turn, is connected to one end of lever 25. This lever, which is fulcrumed at 26, has its opposite end portion 27 normally bearing against but free of the piston 28 of the fender cylinder 29. A rod 30 fixed to the piston 28 limits the movement of the latter by its adjustable stop 31 engaging or abutting the stationary guide 32.

Reference numeral 33 denotes the usual controlling valve connected with the air reservoir and brake cylinder pipes 34 and 35, respectively. The fender cylinder 29 is connected by pipe 36 to a valve 37 interposed between the latter and the air reservoir pipe 34, while a branch pipe 38 of the brake cylinder pipe 35 connects the latter to the fender cylinder pipe 36. An interposed check valve 39 in the branch pipe 38 serves to keep the fluid from the fender cylinder when operating the controlling valve 33.

The valve 37 is opened by the fender to admit the fluid to the fender and brake cylinders. This operation is accomplished by the mechanism now to be described.

Connecting the bracket ends of the supports 4 to the car body are the telescopic trip members each comprising a hollow trip section 40 pivoted to the respective support 4 and a guide rod 41 received by section 40 and normally held in extended relation by spring 42. The trip members therefore constitute yieldable supports, for the fender, which are sufficiently sensitive to yield to open valve 37 to the fender cylinder when the fender strikes an obstacle or obstruction on the track. Adjustable on the trip section 40, I mount a trip element 43 adapted to engage trip lever 44, of rock shaft 45, disposed in the path thereof for rocking said shaft. An arm 46 of shaft 45 is connected by link 47 to the valve 37 to open the latter on yielding movement of the fender to effect a rocking or oscillation of the shaft 45 through the trip element 43.

The degree or amount of yieldability of the fender through its mounting may be varied through the several adjustable members. On encountering an obstruction, the fender yields sufficiently to trip rock shaft 45, as shown in dotted lines in Fig. 3, whereupon the fluid pressure acting in cylinder 29 on piston 28 pulls or moves link bar 24 rearwardly and consequently drops the point of the fender to the track (see dot and dash lined position, Fig. 3). It will be noted, therefore, that the fender drops instantly and, in dropping, recedes from the obstruction to more effectively perform its service.

To set the fender, the fluid pressure is allowed to exhaust from the fender cylinder by moving the valve 37 to an exhaust position, which also permits of the brake cylinder exhausting. For turning the valve to exhaust, I provide a treadle 48 and a handle 49, connected to the valve by link 50, either of which may be employed. The piston spring 28' then returns the piston to its normal position and allows the springs 42 to project the fender to its normal position.

The valve casing 37' comprises an air chamber 51 and a second chamber 52 divided into three compartments and communicating with the air chamber through ports 53. In chamber 51 is mounted, for rotary movement with shaft 54 to which the valve operating means are connected, the valve 37 provided with a port 55 for establishing communication between pipes 34 and 36 and coupling conduits or passageways 56 which are adapted for coupling, or establishing communication between, the pairs of ports 53 for the purpose of exhausting the fluid from the fender and brake cylinders through the exhaust pipe 57. The exhaust pipe 35' of the brake cylinder leads to the valve casing from the controlling valve to provide a course for escape, since the check valve 39 intercepts the return flow of the fluid into pipe 36.

The auxiliary means for dropping the fender operates conjointly with the fluid pressure mechanism although, when the latter is disabled, the former acts to drop the fender without interfering with the companion or main operating mechanism. This auxiliary means or mechanism includes a lever 58 connected by a play connection 59 to the link bar 24 and is urged by leaf springs 60 to retract or pull the bar rearwardly for dropping the fender. A catch 61 retains the lever 58 in its inoperative position against the action of the springs 60, in which position the pin is in the rear of the slot of the play connection 59 to allow movement of the fender to effect opening of the fender valve 37 and releasing of the lever 58 approximately simultaneously with one another. A link 62, operable by a system of levers 63, is connected pivotally to the catch 61 and provided with a cam face 64 up which rides the lever 58, on resetting the fender, into its notch of said catch. The system of levers 63 is connected to the fender valve handle 49 by an articulated member including links 50 and 50'.

In operation, the fender encountering an obstruction yields to open the fender valve by trip members 40 and is then caused to continue its receding movement by the fender cylinder acting upon lever 25 as well as by the leaf springs acting upon the released lever 58. When the fluid pressure mechanism is disabled, the leaf springs 60 supply the motive power for dropping the fender automatically or when the lever 58 is manually released by the fender valve handle. It will be noted that the system of levers 63 is connected for movement with the fender valve by the rock shaft 45, whereby the lever 58 will be released with the opening of the valve 37. Independent operation by the leaf springs permits of the piston 28 remaining inactive owing to the free connection with the lever terminal 27.

The handle 49 is provided with a slot 70 to receive the pivot pin 71, which is fixed to the controlling valve casing, and an aperture 72 in which is inserted a coupling pin 73 of a loosely mounted link 74. This link is connected to the link connection 50 at one end and is formed with a tubular handle 75 which slidably receives the pivot pin 71 and houses a coiled spring 76 for providing sufficient friction to retain the handle on said pivot pin. When removing the handle 49, the coupling link 74 is moved laterally against the action of the spring 76 to withdraw the pin 73 from the aperture 72 whereupon the handle is free. A seat 77 in the controlling valve casing receives the coupling pin when the fender valve handle is removed.

The foregoing detailed description has been given for clearness of understanding only, and no undue limitation is to be understood therefrom, but the appended claims are to be construed as broadly as is permissible in view of the prior art.

Having thus described my invention, what I claim as new, and desire to secure by Letters Patent of the United States of America, is:—

1. In a fender of the character described, a fender apron supported upon a car, and mounted to permit downward movement of its forward edge from its normal position in a receding manner only, and means controllable by the fender apron for effecting movement of the latter.

2. In a fender of the character described, a depending support adapted to be pivotally connected to a car, a fender apron carried by the support for swinging with the latter in a downward, receding movement, and means operable by the fender apron for effecting movement of the support to lower said apron.

3. In a fender of the character described, a fender apron adapted to be mounted on a car for downward, receding movement, means for operating the fender apron, and a second means for operating the fender apron without affecting the first means.

4. In a fender of the character described, a fender apron adapted to be mounted on a car for downward, receding movement, means for operating the fender apron, and a second means for operating the fender apron, both means being controllable by the fender apron.

5. In a fender of the character described, a fender apron adapted to be mounted on a car for downward movement to an operative position, means under control of the fender apron for moving the latter to an operative position, and auxiliary means independent of the first means for operating the fender apron.

6. In a fender of the character described, a fender apron adapted to be mounted on a car for downward movement from its normal position in a receding manner only, a fluid pressure cylinder fixed on the car, and a piston in the cylinder for effecting a dropping of the fender apron.

7. In a fender of the character described, a fender apron adapted to be mounted on a car for receding dropping movement, said apron being adapted for receding initially on striking an obstruction, and a mechanism operable by the fender during its initial receding movement and connected to the fender for continuing the receding movement thereof to its operative position.

8. In a fender of the character described, a fender apron adapted to be mounted on a car for receding dropping movement, said apron being adapted for receding initially on striking an obstruction, and a mechanism fixed on the car and operable by the fender during its initial receding movement, said mechanism being connected to the fender for continuing the receding movement thereof to its operative position.

9. In a fender of the character described, a fender apron adapted to be pivotally connected to a car for dropping to the road surface, means on the car under control of the fender for effecting a dropping of the fender apron, and an operative connection interposed between the fender apron and said means.

10. In a fender of the character described, a fender apron adapted to be pivotally connected to a car for dropping toward the road surface, means on the car for effecting a dropping of the fender apron, and a connection carried on the car and interposed between the fender apron and said means to permit of independent movement of the apron prior to establishing an operative connection therebetween for continuing the pivotal movement of the apron.

11. In a fender of the character described, a fender apron adapted to be mounted on a car for lowering movement, independently operable means each adapted for lowering the apron, and means operable by the apron on encountering an obstruction for effecting operation of the first means.

12. In a fender of the character described, a fender apron adapted to be mounted on a car for lowering movement, a fluid pressure cylinder, a piston therein adapted for lowering the apron, spring actuated means connected to the fender apron for lowering the latter, and means operable by the fender apron for admitting fluid pressure to the cylinder.

13. In a fender of the character described, a fender apron adapted to be mounted on a car for lowering movement, a fluid pressure cylinder, a piston therein adapted for lowering the apron, spring actuated means connected to the fender apron for lowering the latter, and means operable by the fender apron for admitting fluid pressure to the cylinder, and releasing the spring actuated means.

14. In a fender of the character described, a fender apron, a support adapted to be mounted on a car and carrying the apron for lowering movement, a link bar connected to and extending rearwardly from the apron support and adapted for lowering the apron, and means for effecting movement of the link bar for lowering the apron.

15. In a fender of the character described, a fender apron, a support adapted to be mounted on a car and carrying the apron for lowering movement, a link bar extending rearwardly from the apron support and adapted for lowering the apron, and means under control of the fender apron for effecting movement of the link bar for lowering the apron.

16. In a fender of the character described, a fender apron, a support adapted to be mounted on a car and carrying the apron for lowering movement, a link bar extending rearwardly from the apron support and adapted for lowering the apron, fluid pressure means having a free connection with the link bar and adapted for moving the latter, other means connected for lowering the apron, and means under control of the fender apron for effecting operation of the fluid pressure means and said second means.

17. In a fender of the character described, a fender apron adapted to be mounted on a car for downward movement from its normal position in a receding manner only, means for effecting movement of the fender apron, and adjustable means for limiting the movement of the first means.

18. In a fender of the character described, a fender apron adapted to be mounted on a car for downward, receding movement, fluid pressure means including a piston for effecting movement of the fender apron, and adjustable means for limiting the stroke of said piston.

19. In a fender of the character described, a fender apron adapted to be mounted on a car for downward, receding movement, a fluid pressure cylinder, a piston in said cylinder for effecting movement of the fender apron, an adjustable stop operable by the piston, and stationary guide means on the cylinder adapted to be engaged by the stop for limiting the stroke of the piston.

Signed at Seattle, Washington this 24th day of March 1914.

EMIL M. KNOTHE.

Witnesses:
CLARA A. HARM,
SAMSON M. BROOKS.

Copies of this patent may be obtained for five cents each, by addressing the "Commissioner of Patents, Washington, D. C."